(12) United States Patent
Morin et al.

(10) Patent No.: US 12,095,354 B2
(45) Date of Patent: Sep. 17, 2024

(54) METHOD FOR CONTROLLING AN ELECTRIC ENERGY CONVERTER, AND CORRESPONDING CONVERTER

(71) Applicant: TRONICO, Saint-Philibert de Bouaine (FR)

(72) Inventors: Cédric Morin, Saint-Sébastien sur Loire (FR); Olivier Lugbull, Pont Saint Martin (FR); Pascal Plantard, Basse Goulaine (FR)

(73) Assignee: TRONICO, Saint-Philibert de Bouaine (FR)

( * ) Notice: Subject to any disclaimer, the term of this patent is extended or adjusted under 35 U.S.C. 154(b) by 579 days.

(21) Appl. No.: 17/231,775

(22) Filed: Apr. 15, 2021

(65) Prior Publication Data
US 2021/0328503 A1  Oct. 21, 2021

(30) Foreign Application Priority Data
Apr. 16, 2020 (FR) ........................................ 2003836

(51) Int. Cl.
*H02M 1/32* (2007.01)
(52) U.S. Cl.
CPC ..................................... *H02M 1/32* (2013.01)
(58) Field of Classification Search
CPC ........................................................ H02M 1/32
See application file for complete search history.

(56) References Cited

U.S. PATENT DOCUMENTS

| | | | |
|---|---|---|---|
| 7,119,524 B2 * | 10/2006 | Bretz | ...................... H02M 1/32 323/275 |
| 10,103,663 B1 | 10/2018 | Wagoner et al. | |

(Continued)

FOREIGN PATENT DOCUMENTS

| | | |
|---|---|---|
| EP | 3093970 A1 | 11/2016 |
| KR | 101659901 B1 | 9/2016 |

OTHER PUBLICATIONS

French Search Report and Written Opinion dated Dec. 21, 2020 for corresponding French Application No. FR2003836, filed Apr. 16, 2020.

(Continued)

*Primary Examiner* — Rafael O De Leon Domenech
(74) *Attorney, Agent, or Firm* — David D. Brush; Westman, Champlin & Koehler, P.A.

(57) ABSTRACT

A method for controlling an electric energy converter, which includes, for at least one first physical quantity of the converter having a variable maximum that is a function of a plurality of possible operating points, each possible operating point being associated with a value of the variable maximum and being defined by a value of at least one operating parameter of the converter: determining a current operating point of the converter from the plurality of possible operating points; determining the value of the variable maximum associated with the current operating point, referred to as a first value; determining a current value of the at least one first physical quantity, referred to as a second value; and activating or not activating a limiter circuit, which limits the at least one first physical quantity, as a function of a result of a comparison between the first value and the second value.

13 Claims, 9 Drawing Sheets

(56) References Cited

U.S. PATENT DOCUMENTS

| | | | |
|---|---|---|---|
| 2003/0094942 A1* | 5/2003 | Friend | G01R 33/0206 |
| | | | 324/244 |
| 2005/0007082 A1 | 1/2005 | Bretz et al. | |
| 2016/0084180 A1* | 3/2016 | Zhu | F02D 41/1401 |
| | | | 701/103 |
| 2017/0054291 A1 | 2/2017 | Qi et al. | |

OTHER PUBLICATIONS

English translation of the Written Opinion dated Dec. 21, 2020 for corresponding French Application No. FR2003836, filed Apr. 16, 2020.

* cited by examiner

METHOD FOR CONTROLLING AN ELECTRIC ENERGY CONVERTER, AND CORRESPONDING CONVERTER

1. TECHNICAL FIELD

The field of the invention is that of electric energy conversion. More specifically, the invention relates to a method for controlling an electric energy converter, as well as a corresponding converter.

This can be any type of converter (isolated or non-isolated): DC/DC, DC/AC, AC/AC, AC/DC.

The invention has many applications since an electric energy converter can be used, in particular but exclusively, with power sources and loads such as batteries, supercapacitors, fuel cells, photovoltaic panels, regulated voltage buses, and motor or generator loads, etc.

2. BACKGROUND ART

Two known solutions for controlling the output power of a DC/DC-type electric energy converter will now be described. The same problem exists with the other types of converters (DC/AC, AC/AC and AC/DC).

According to a first known solution, a single constraint is applied: the output power must be less than or equal to a maximum output power $P_{max}$ which is constant whatever the operating point of the converter, i.e. whatever the pair ($V_{low-side}$, $V_{high-side}$), where $V_{low-side}$ is the input voltage of the converter (comprised between $V_{low-side/min}$ and $V_{low-side/max}$) and $V_{high-side}$ is the output voltage of the converter (comprised between $V_{high-side/min}$ and $V_{high-side/max}$).

A second known solution proposes combining:
  a first constraint of the same nature as that of the first known solution (i.e.: whatever the operating point of the converter, the output power must be less than or equal to a maximum output power $P_{max}$ which is constant), but with a maximum output power value that is greater than in the first known solution;
  with two additional constraints:
    whatever the operating point of the converter, the input current (denoted $I_{low-side}$) must be less than or equal to a maximum input current that is constant (denoted $I_{low-side/max}$); and
    whatever the operating point of the converter, the output current (denoted $I_{high-side}$) must be less than or equal to a maximum output current that is constant (denoted $I_{high-side/max}$).

As shown in FIG. 1, with the second known solution, there are three values which limit the performance levels of the converter 10: the maximum power $P_{max}$, the maximum input current $I_{low-side/max}$ and the maximum output current high-side/max. Once the converter has been designed, these are fixed values. The protections ensuring that the converter does not surpass these three limits include three comparators (given the reference numerals 5, 7 and 9) for comparing with these three limits, as well as a limiter block 2, which receives the output signals from the three comparators and generates a control signal $S_c$ in order to clip the operation of a power conversion block 1 if one of the three limit values is surpassed. For this purpose, the three limit values are compared with three current values ($I_{low-side}$, $I_{high-side}$ and P) by means of the three aforementioned comparators (5, 7 and 9). The three current values are obtained using three sensors (given the reference numerals 4, 6 and 8) that continuously measure and/or compute the power, the input current and the output current. In the embodiment shown, the limiter block 2 also receives a regulation signal $S_r$ generated by a regulator block 3 which receives, at the input, a value to be regulated and a corresponding setpoint value. If none of the aforementioned three limit values is surpassed, the control signal $S_c$ generated by the limiter block 2 is a function of the regulation signal $S_r$ and is intended to affect the value to be regulated (without clipping the output power).

In this way, for certain operating points (hereinafter referred to as the "first set of operating points"), one of the additional constraints is applied to limit the output power P of the converter, which can be expressed as a function of the input current ($P=V_{low-side} \times I_{low-side}$) or as a function of the output current ($P=V_{high-side} \times I_{high-side}$). For the other operating points (hereinafter referred to as the "second set of operating points"), the first constraint is applied to limit the output power of the converter, but with a maximum output power value that is greater than in the first known solution. The second known solution thus allows the maximum output power that can be reached at certain operating points (in particular those of the second set) to be increased compared to the first solution.

FIG. 6 is an example of a table of maximum powers obtained, for various operating points, with the converter in FIG. 1 and the following constants: $I_{low-side/max}$=38 A, $I_{high-side/max}$=32 A and $P_{max}$=18 kW. The first column 61 contains the range [$V_{low-side/min}$, $V_{low-side/max}$] expressed in V, where: $V_{low-side/min}$=400 V and $V_{low-side/max}$=600 V. The first row 62 contains the range [$V_{high-side/min}$, $V_{high-side/max}$] (in Volts), where: $V_{high-side/min}$=500 V and $V_{high-side/max}$=700 V. Each box at a row/column intersection, corresponding to a pair ($V_{low-side}$, $V_{high-side}$), contains the associated maximum power value, expressed in kW. For example, for the operating point ($V_{low-side}$=600 V, $V_{high-side}$=590 V), there is a maximum power of 18 kW (box given the reference numeral 63). The area given the reference numeral 64 corresponds to the aforementioned second set of operating points (for which the first constraint applies), in this example with a maximum power of 18 kW.

However, the second known solution is not entirely satisfactory. More specifically, the two additional constraints are based on two parameters limiting the power supply, i.e. the input current and the output current. For the first constraint, all other parameters limiting the power supply are grouped together under the single limitation of the maximum output power (excluding current). However, this maximum output power must be operational at all of the operating points, so it is actually the minimum of all of the maximum powers associated with all of the operating points (see detailed explanation hereinbelow). One drawback of the second known solution is thus that it does not allow for optimisation of the power output at all operating points.

Detailed explanation of the "minimum of all of the maximum powers": the operating point for which the power is minimal (i.e. the operating point whose associated maximum power is the minimum of all the maximum powers associated with the different operating points) is known; it is one of the "end points" of the range of the operating points (a two-dimensional range: one corresponding to the input voltage and the other to the output voltage). These end points are those for which the input voltage or the output voltage is minimal or maximal. As a result, the maximum power computations (one per operating point), then the computations for determining the minimum thereof (to define the maximum power over the whole range), are carried out only for the end points so that limiting conditions (for example for temperature and current) of critical components of the converter (for example diodes, transistors and inductors) are not surpassed. Other system components (for example current sensors or copper tracks) are dimensioned so as to operate within the desired range without ever being critical parameters. The approach can be summarised as follows: definition of the desired voltage ranges, dimensioning of the critical components at the end points (definition of the maximum power that can be achieved over the whole range) and selection of the other components so that they are compatible with the defined maximum power).

In practice, in order to limit the impact of the aforementioned drawback, limiting the range of the operating points is sometimes proposed to prevent the need to reduce the maximum output power due to extreme conditions. In other words, to prevent the minimum of all maximum powers associated with all operating points from being too low, the range is reduced. It is understood that this limitation of the range of the operating points is not a satisfactory solution.

3. PURPOSES

The purpose of the invention, according to at least one embodiment, is in particular to overcome these various drawbacks of the prior art.

More specifically, according to at least one embodiment of the invention, one purpose is to provide a technique (method and corresponding converter) for controlling an electric energy converter, which allows the maximum output power that can be achieved at certain operating points to be further increased compared to the second known solution.

More generally, according to at least one embodiment of the invention, one purpose is to provide a technique (method and corresponding converter) for controlling an electric energy converter which, at certain operating points, allows the performance levels of the converter to be improved for at least one physical quantity thereof (in particular but not exclusively the output power thereof).

A further purpose of at least one embodiment of the invention is to provide such a technique that allows wider operating ranges to be obtained compared to the second known solution.

A complementary purpose of at least one embodiment of the invention is to provide such a technique that is simple to implement and inexpensive.

4. SUMMARY

One specific embodiment of the invention proposes a method for controlling an electric energy converter, comprising the following steps, for at least one first physical quantity of the converter having a variable maximum that is a function of a plurality of possible operating points, each of the possible operating points being associated with a value of the variable maximum and being defined by a value of at least one operating parameter of the converter:
  determining a current operating point of the converter from said plurality of possible operating points;
  determining the value of the variable maximum associated with the current operating point, referred to as a first value;
  determining a current value of said at least one first physical quantity, referred to as a second value; and
  activating or not activating a means of limiting said at least one first physical quantity, as a function of a result of a comparison between the first value and the second value.

Thus, the proposed solution proposes an entirely novel and inventive approach consisting, for at least one first physical quantity of the converter (which can in particular but not exclusively be the output power of the converter), of defining a value of the maximum of this first physical quantity at each possible operating point. In this way, the maximum of the first physical quantity is not fixed over the operating range (i.e. over all possible operating points), but is a variable maximum such that each operating point is associated with a value of this variable maximum.

Based on this novel approach (and thus on the fact that a value of the aforementioned variable maximum is associated with each operating point), the proposed method consists, for a current operating point (and thus iteratively for successive operating points in time) of determining the value of the variable maximum that is associated with this current operating point and of activating or not activating a limitation of the first physical quantity (for example this limitation involves clipping the output power) as a function of the result of a comparison between this value of the variable maximum and a current value of the first physical quantity.

The proposed method improves converter use by the continuous operation thereof, i.e. for each current operating point, at the functional limit of said at least one first physical quantity (limit corresponding to the value of the variable maximum associated with the current operating point). In other words, the proposed solution makes it possible to decorrelate the value of the maximum for the current operating point from the range of possible operating points in order to compute the maximum of the first physical quantity.

In particular, in the case where the first physical quantity is the output power of the converter, the proposed method does not require (unlike the second known solution) the minimum of all of the maximum powers associated with all of the operating points of the range to be computed. In such a case, the proposed method allows the power output by the converter to be improved (or even optimised) for certain operating points.

Moreover, the proposed method allows for wider operating ranges than with the second known solution (no limitation of the range of the operating points to prevent the need to reduce the maximum output power due to extreme conditions).

According to one specific feature, the means of limiting said at least one first physical quantity is activated if the second value is greater than or equal to the first value.

Thus, any surpassing of the value of the variable maximum that is associated with the current operating point is prevented or at the very least is reduced. According to an alternative embodiment, the limiting means is activated even earlier, for example as soon as the second value reaches a predetermined percentage (for example 95%) of the first value, in order to prevent the first value (the value of the variable maximum that is associated with the current operating point) from being surpassed as far as possible.

According to one specific feature, when determining said first value:
  if a single limiting factor of said at least one first physical quantity is taken into account and has a limit value, the first value results from the following computation:
    computing the first value as a function of the limit value of the limiting factor and of the current operating point; and
  if a plurality of limiting factors of said at least one first physical quantity are taken into account and each have an associated limit value, the first value results from the following computations:

for each of the limiting factors, computing a value of the variable maximum of said at least one first physical quantity, as a function of the limit value of the limiting factor and of the current operating point; and selecting, for the first value, a minimum value from the values of the variable maximum computed for the plurality of limiting factors.

The determination of the first value (value of the variable maximum associated with the current operating point) is increasingly efficient as the number of limiting factors increases. For factors that are not taken into account, values are chosen (i.e. dimensioning is carried out) to ensure that they are not limiting (and thus do not have to be incorporated into the computations).

According to one specific feature, the one limiting factor or each limiting factor belongs to the group comprising:
an input current of the converter;
an output current of the converter;
an input current ripple of the converter;
an output current ripple of the converter;
a duty cycle of the converter;
a temperature of an electronic chip incorporating at least one component included in the converter, in particular a diode or a transistor;
a temperature of an inductor included in the converter;
a current flowing through an electronic chip incorporating at least one component included in the converter, in particular a diode or a transistor;
a current flowing through an inductor included in the converter;
a power dissipated by an inductor included in the converter;
a saturation current of an inductor included in the converter; and
a factor external to the converter.

This list of limiting factors is not exhaustive.

According to one specific feature, said at least one first physical quantity belongs to the group comprising:
an output power of the converter;
an input power of the converter;
an output current of the converter;
an input current of the converter; and
losses in the converter.

Thus, the general principle of the proposed solution is not limited to the case where the first physical quantity is the output power of the converter. This list of first physical quantities is not exhaustive.

In a first specific implementation, the determination of the first value comprises querying, as a function of the current operating point of the converter, a pre-computed table which associates a value of the variable maximum with each of the possible operating points.

Thus, in this first implementation, the computations (of the values of the variable maximum that are associated with the different operating points) are carried out in advance, which simplifies the implementation of the method by the converter. In such a case, the computations are based on a modelling of the one or more limiting factors of the first physical quantity of the converter.

In a second specific implementation, the determination of the first value comprises computing, dynamically at least in part, the first value as a function of the current operating point of the converter.

Thus, in this second implementation, the computations (of the values of the variable maximum that are associated with the different operating points) are partially or fully (see description hereinbelow) carried out on the fly. In such a case, the computations (or a part thereof) can be based on real measurements (and not on a model) of the one or more limiting factors of the first physical quantity of the converter.

According to one specific feature, the method comprises the following steps, for at least one second physical quantity of the converter having a fixed maximum for the plurality of possible operating points, the fixed maximum having a third value:
determining a current value of said at least one second physical quantity, referred to as a fourth value; and
activating or not activating a means of limiting said at least one second physical quantity, as a function of a result of a comparison between the third value and the fourth value.

Thus, the proposed method further allows at least one second physical quantity of the converter to be controlled, which physical quantity has a fixed maximum whatever the operating point (and is thus different from said at least one first physical quantity which has a variable maximum that is a function of the operating points). One advantage lies in that each second physical quantity that is controlled separately no longer constitutes a limiting factor that must be incorporated into the control computations for said at least one first physical quantity, thus simplifying these computations.

According to one specific feature, the means of limiting said at least one second physical quantity is activated if the fourth value is greater than or equal to the third value.

Thus, any surpassing of the value of the fixed maximum (referred to herein as the "third value") of the second physical quantity is prevented or at the very least is reduced. According to an alternative embodiment, the limiting means is activated even earlier, for example as soon as the fourth value reaches a predetermined percentage (for example 95%) of the third value, in order to prevent the third value (the value of the fixed maximum) from being surpassed as far as possible.

According to one specific feature, said at least one second physical quantity belongs to the group comprising:
a chip temperature of a component included in the converter; and
a temperature of a component included in the converter;
a temperature of an element in the vicinity of a component included in the converter or in the vicinity of a chip of a component included in the converter;
a voltage of a point inside the converter; and
a voltage deviation between two points inside the converter.

This list of second physical quantities is not exhaustive.

According to one specific feature, said at least one operating parameter of the converter belongs to the group comprising:
an ambient temperature;
a cooling temperature;
an input voltage;
an output voltage;
a thermal resistance;
a forward voltage Vf of at least one diode included in the converter;
a resistance Rdson of at least one transistor included in the converter;
a switching loss characteristic of at least one switching element of the converter;
an electrical resistance of at least one current conductor of the converter;

a characteristic of at least one wound element of the converter;

a thermal resistance of at least one cooling element of the converter.

This list of operating parameters is not exhaustive.

Another embodiment of the invention proposes an electric energy converter comprising, for at least one first physical quantity of the converter having a variable maximum that is a function of a plurality of possible operating points, each of the possible operating points being associated with a value of the variable maximum and being defined by a current value of at least one operating parameter of the converter:

means for determining a current operating point of the converter from said plurality of possible operating points;

means for determining the value of the variable maximum associated with the current operating point, referred to as a first value;

means for determining a current value of said at least one first physical quantity, referred to as a second value; and means for activating or not activating a means of limiting said at least one first physical quantity, as a function of a result of a comparison between the first value and the second value.

In other words, the converter comprises various means configured to implement the method described hereinabove, according to any of the different embodiments thereof. The associated technical advantages have been described in detail hereinabove.

According to one specific feature, the converter further comprises, for at least one second physical quantity of the converter having a fixed maximum for the plurality of possible operating points, the fixed maximum having a third value:

means for determining a current value of said at least one second physical quantity, referred to as a fourth value; and means for activating or not activating a means of limiting said at least one second physical quantity, as a function of a result of a comparison between the third value and the fourth value.

5. LIST OF FIGURES

Other features and advantages of the invention will be better understood upon reading the following description, which is given as a rough guide and in no way as a limiting guide, with reference to the accompanying drawings, in which:

FIG. 1, already described with reference to the prior art, shows one example of a known DC/DC-type converter configured to implement a known output power control solution;

FIG. 5 shows one example of a table obtained by running the algorithm in FIG. 4;

FIG. 6 is one example of a table of maximum powers obtained, for various operating points, with the converter in FIG. 1 (known);

FIG. 7 is one example of a table of maximum powers obtained, for various operating points, with the converter in FIG. 3 (specific embodiment of the invention);

6. DETAILED DESCRIPTION

Figure 1:
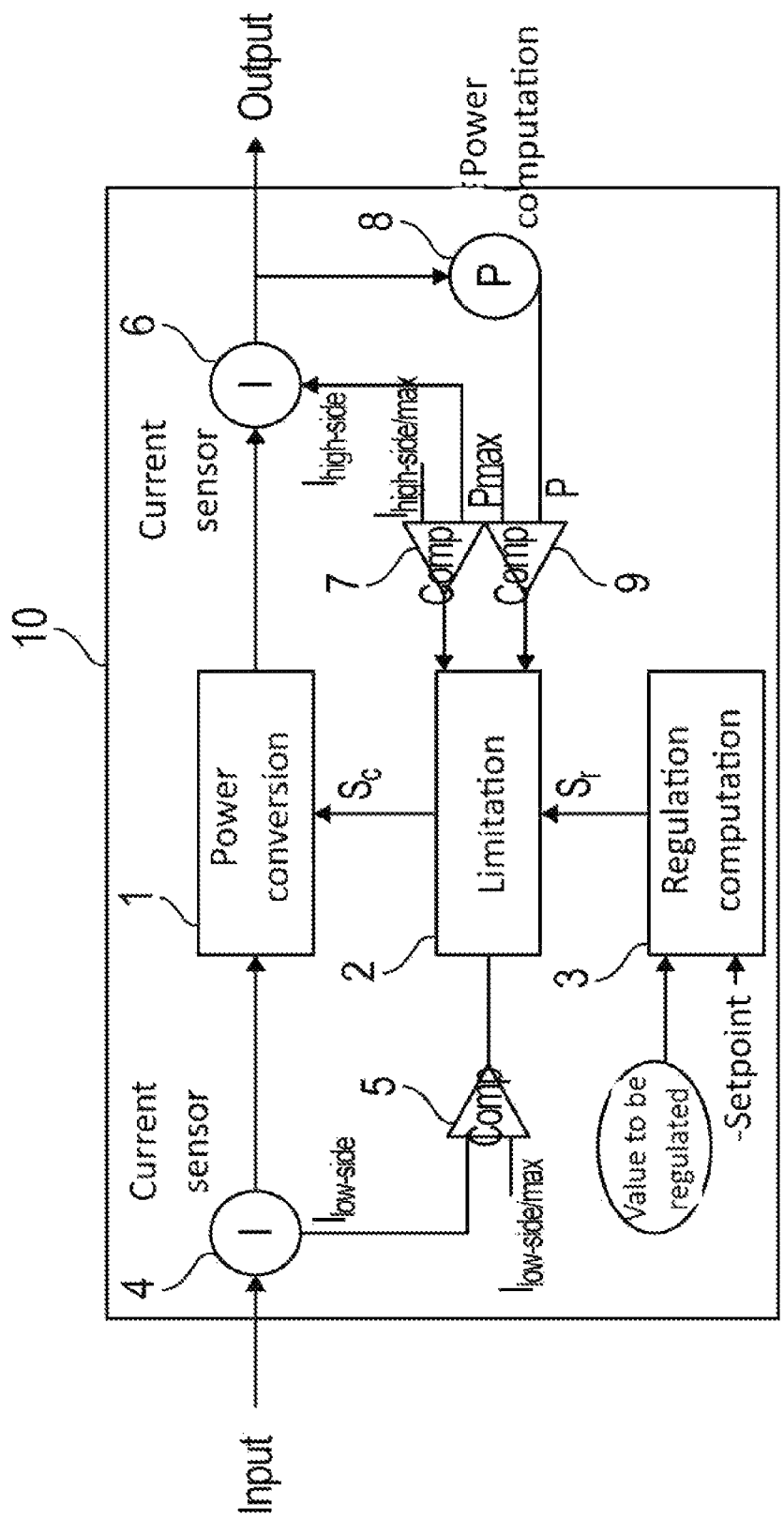

Identical elements and steps are denoted by the same reference numeral in all figures of the present document.

One specific embodiment of the method according to the invention for controlling at least one first physical quantity of a DC/DC-type electric energy converter will now be described with reference to FIG. 2. As already mentioned hereinabove, the present invention is not limited to this type of converter and is also applicable to other types of converters (isolated or non-isolated): DC/AC, AC/AC and AC/DC.

As described in detail hereinbelow, the first physical quantity of the converter has a variable maximum that is a function of a plurality of possible operating points. Each of the possible operating points is associated with a value of the variable maximum (a plurality of operating points can be associated with the same value of the variable maximum).

Each of the possible operating points is defined by the value of one or more operating parameters of the converter, such as (but not limited to):

the ambient temperature of the space in which the converter is placed;

the cooling temperature (temperature of the coolant (for example the liquid) used in the converter);

the input voltage of the converter;

the output voltage of the converter;

the thermal resistance of the converter;

the forward voltage Vf of at least one diode included in the converter;

the resistance Rdson (drain-source on resistance) of at least one transistor included in the converter;

the switching loss characteristic of at least one switching element of the converter (transistor, diode, etc.);

the electrical resistance of at least one current conductor of the converter (PCB, cables, wire of the wound elements, etc.);

at least one characteristic of at least one wound element of the converter;

the thermal resistance of at least one cooling element of the converter;

etc.

The operating parameters are thus variable parameters whose evolution over time (i.e. the successive values) can be obtained either by external information (for example receipt, by communication, of conditions of use of the converter) or by internal measurement (for example voltage measurements).

The description hereinbelow is given, for illustration purposes, for the specific case where the first physical quantity controlled is the output power of the converter and where each operating point is defined by the values of a pair of operating parameters: the input voltage of the converter ($V_{low\text{-}side}$) and the output voltage of the converter ($V_{high\text{-}side}$).

As already mentioned hereinabove, the present invention is not limited to this specific case. It further applies if the above-mentioned control is supplemented or replaced by the control of one or more other first physical quantities, each having a maximum that varies as a function of a plurality of possible operating points:

an input power of the converter;
an output current of the converter;
an input current of the converter;
losses in the converter;
etc.

It further applies if the operating points are defined differently, i.e. with one or more operating parameters that do not include the pair of input and output voltages of the converter ($V_{low\text{-}side}$, $V_{high\text{-}side}$).

Figure 2:
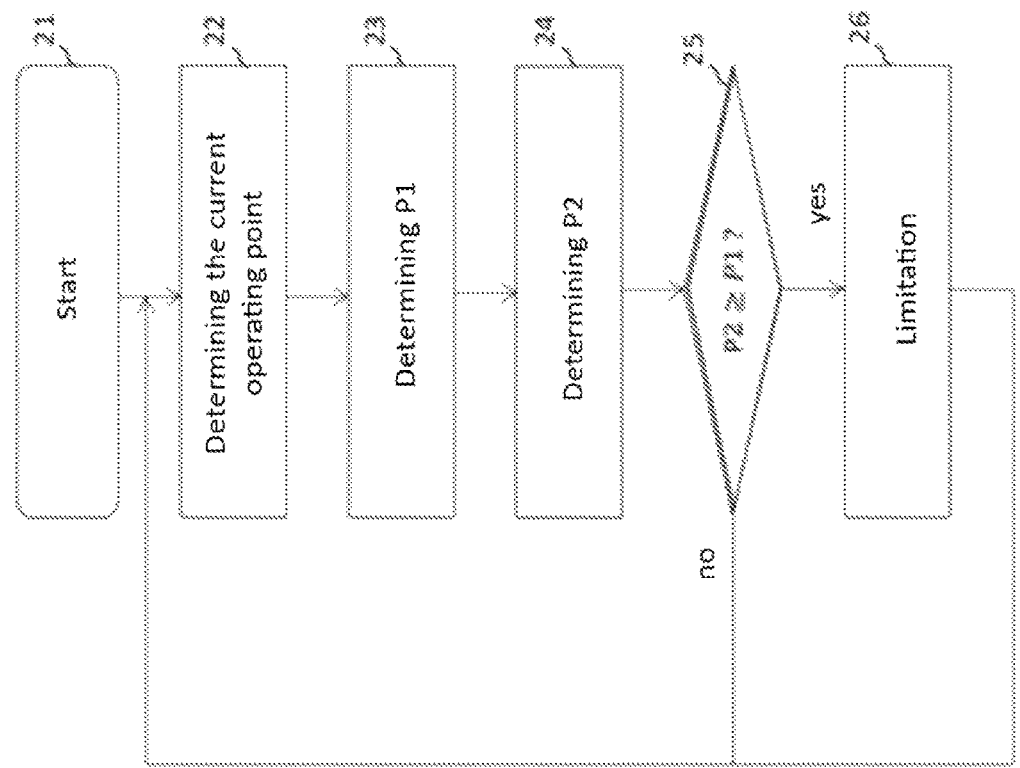
FIG. 2 shows a flow chart of a method, according to one specific embodiment of the invention, for controlling at least one first physical quantity (output power, for example) of a DC/DC-type converter.

In the example shown in FIG. 2, the method comprises the steps 22 to 26 which, after the starting step 21, are carried out iteratively (i.e. for successive operating points in time).

Step 22: determining a current operating point of the converter from the plurality of possible operating points. In other words, current values for the pair of input and output voltages of the converter ($V_{low\text{-}side}$, $V_{high\text{-}side}$) are determined.

Step 23: determining the value of the variable maximum associated with the current operating point, referred to as the first value P1.

If a single limiting factor of the output power is taken into account and has a limit value, the first value P1 is computed as a function of the limit value of the single limiting factor and of the current operating point.

If a plurality of limiting factors of the output power are taken into account and each has an associated limit value, the first value P1 results from the following computations:

for each of the limiting factors, computing a value of the variable maximum of the output power, as a function of the limit value of the limiting factor and of the current operating point; and selecting, for the first value P1, a minimum value from the values of the variable maximum computed for the plurality of limiting factors.

The term 'limiting factors' is in particular understood to mean, in a non-limiting manner:

the input current of the converter ($I_{low\text{-}side}$);
the output current of the converter ($I_{high\text{-}side}$);
the input current ripple of the converter;
the output current ripple of the converter;
the duty cycle of the converter;
the temperature of an electronic chip incorporating at least one component included in the converter, in particular a diode or a transistor;
the temperature of an inductor included in the converter;
the current flowing through an electronic chip incorporating at least one component included in the converter, in particular a diode or a transistor;
the current flowing through an inductor included in the converter;
the power dissipated by an inductor included in the converter;
the saturation current of an inductor included in the converter;

factors external to the converter (i.e. related to the environment of the converter), in particular such as (but not limited to): fuel cell life, battery or supercapacitor state of charge or life, external temperature, etc.;

etc.

Example: computation of a value (denoted MAX ($P_{out}$)) of the variable maximum of the output power (denoted $P_{out}$) in the specific case where the limiting factor is the temperature (denoted $Temp_{tr}$) of an electronic chip incorporating a transistor.

The power of the transistor is known to be written:

$$P_{tr} = \frac{R_{dson}}{3} * (I_{max})^2 * \frac{(V_{high\text{-}side} - V_{low\text{-}side})}{V_{high\text{-}side}}$$

where $I_{max}$ is the maximum current in the transistor and $R_{dson}$ is the drain-source on resistance of the transistor.

It is also known that:

$$I_{max} = 2 * \frac{P_{out}}{V_{low\text{-}side}}$$

It is deduced therefrom that:

$$P_{tr} = 4 * \frac{R_{dson}}{3} * (P_{out})^2 * \frac{V_{high\text{-}side} - V_{low\text{-}side}}{V_{high\text{-}side} * (V_{low\text{-}side})^2}$$

Thus:

$$P_{out} = \sqrt{\frac{3 * P_{tr}}{4 * R_{dson}} * \frac{V_{high\text{-}side} * (V_{low\text{-}side})^2}{V_{high\text{-}side} - V_{low\text{-}side}}}$$

It is also known that:

$$P_{tr} = \frac{Temp_{tr} - Temp_{water}}{R_{th \cdot tr}}$$

where $Temp_{water}$ is the temperature of the converter cooling water and $R_{th.tr}$ is the thermal resistance of the transistor.

It is deduced therefrom that:

$$P_{out} = \sqrt{\frac{3}{4 * R_{dson}} * \frac{V_{high\text{-}side} * (V_{low\text{-}side})^2}{V_{high\text{-}side} - V_{low\text{-}side}} * \frac{Temp_{tr} - Temp_{water}}{R_{th \cdot tr}}}$$

Thus:

$$MAX(P_{out}) = \sqrt{\frac{3}{4 * R_{dson}} * \frac{V_{high\text{-}side} * (V_{low\text{-}side})^2}{V_{high\text{-}side} - V_{low\text{-}side}} * \frac{MAX(Temp_{tr}) - Temp_{water}}{R_{th \cdot tr}}}$$

To summarise, in this example, for the limiting factor $Temp_{tr}$, a value of the variable maximum (MAX($P_{out}$)) of the output power is computed, as a function of the limit value MAX($Temp_{tr}$) of the limiting factor and of the current operating point (defined by the pair of operating parameters $V_{low\text{-}side}$ and $V_{high\text{-}side}$). As mentioned hereinabove, if a plurality of limiting factors of the output power are taken into account, the same is applied for each of the other limiting factors (computing for each a value of the variable maximum of the output power, as a function of the limit value of the limiting factor and of the current operating point), then the value P1 is obtained by selecting a minimum value from the values of the variable maximum computed for the plurality of limiting factors.

In one specific implementation, the determination of the first value P1 comprises querying, as a function of the current operating point of the converter, a pre-computed table and associating a value of the variable maximum with each of the possible operating points. Such a table is also referred to as a "k-dimensional array", where k is the number of operating parameters defining each operating point. For example, k=2 in the case where each operating point is defined by the values of the pair of operating parameters $V_{low-side}$ and $V_{high-side}$.

According to an alternative embodiment, the determination of the first value P1, as a function of the current operating point of the converter, comprises a computation that is at least in part dynamic:

in a first implementation of the aforementioned alternative embodiment, the computation of the first value P1 is entirely dynamic (i.e. entirely carried out on the fly);

in a second implementation of the aforementioned alternative embodiment, the computation of the first value P1 comprises a first part of sub-computations carried out beforehand and a second part of sub-computations carried out on the fly. The results of the first part of the sub-computations (also referred to as the "intermediate results") are, for example, stored in the converter in the form of one or more sub-tables (also referred to as "k'-dimensional arrays", where k'<k) which are used as input data during the second part of the sub-computations, in combination with current information (received or derived from real-time measurements) relating to the one or more k-k' dimensions (i.e. to the one or more k-k' operating parameters) not used in the one or more k'-dimensional arrays.

Step 24: determining (by measurement and/or computation) a current value of the output power, referred to as the second value P2.

Step 25: comparing P2 (the current value of the output power) with P1 (the value of the variable maximum associated with the current operating point). In one specific implementation, testing "Is P2 greater than or equal to P1?".

Step 26: activating or not activating a limiter circuit, which limits the output power (such a limiter circuit is conventional and well known to a person skilled in the art; it is thus not described in more detail), as a function of the result of the comparison in step 25. In one specific implementation, limiting the output power if P2 is greater than or equal to P1.

Figure 3:
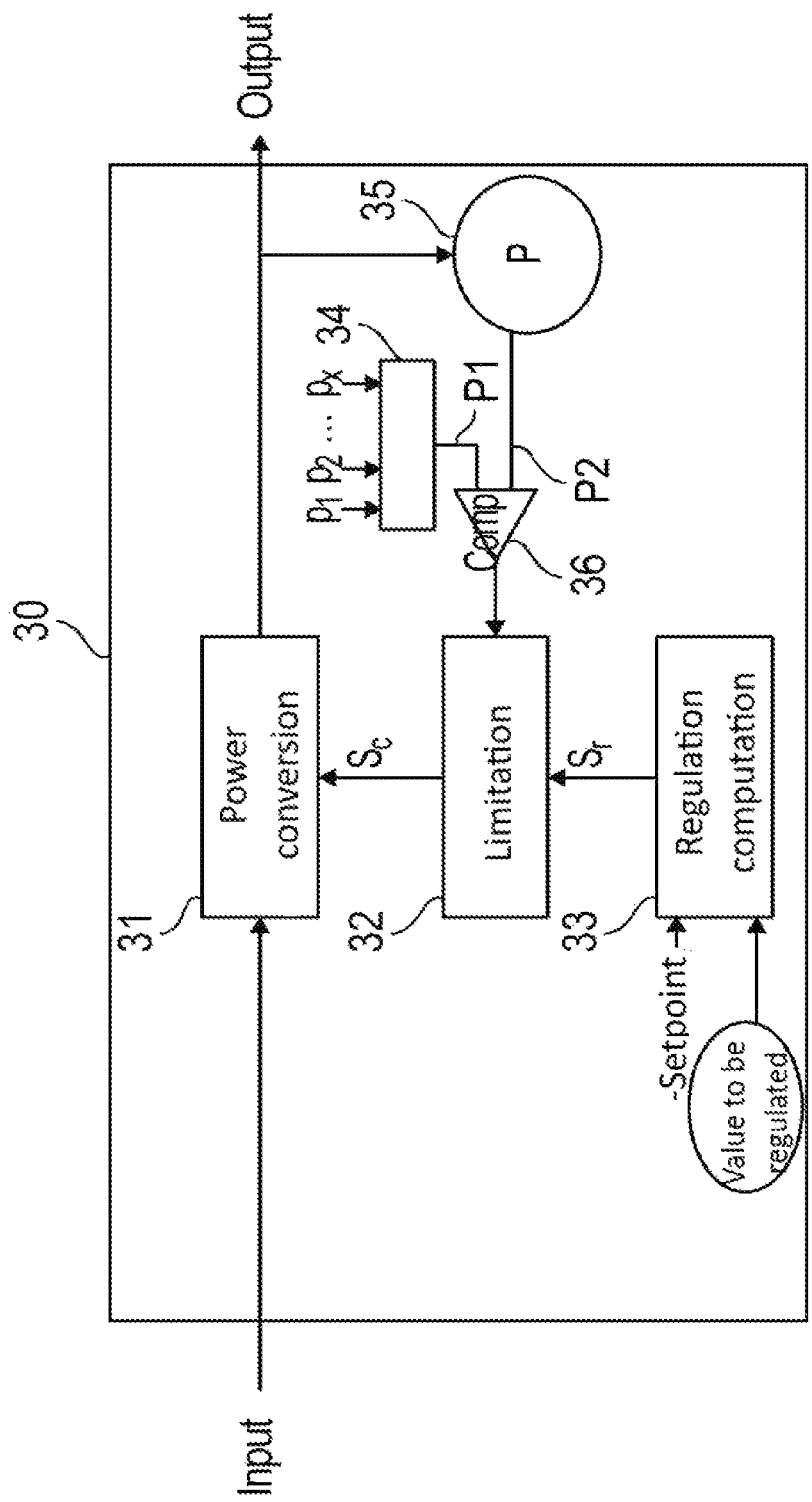
FIG. 3 shows one example of a DC/DC-type converter configured to implement the method according to the embodiment shown in FIG. 2.

FIG. 3 shows one example of a DC/DC-type converter (given the reference numeral 30) configured to implement the method according to the embodiment shown in FIG. 2.

Unlike the known solution in FIG. 1, there is only one value that limits the performance levels of the converter 30, that is to say P1 the value of the variable maximum associated with the current operating point. In other words, the output power of the converter has a maximum that is variable (that is a function of the operating points), and not fixed as in the known solution in FIG. 1.

The converter 30 in FIG. 2 comprises:
a power conversion block 31;
a regulator block 33, which receives, at the input, a value to be regulated and a corresponding setpoint value, and which generates a regulation signal $S_r$;

a limiter block 32 which receives the control signal $S_c$ and the output signal from a comparator 36; the limiter block 32 generates a control signal $S_c$ which is intended to clip the operation of the power conversion block 1, if the output signal from the comparator 36 indicates that the value P1 has been reached or surpassed by the value P2 (current value of the output power, supplied by a measuring and/or computing block 35 continuously measuring and/or computing the output power); if the output signal from the comparator 36 indicates that the value P2 is lower than the value P1, the control signal $S_c$ generated by the limiter block 32 is a function of the regulation signal $S_r$ and is intended to affect the value to be regulated (without clipping the output power).

The power conversion block 31, limiter block 32 and regulation block 33 are conventional blocks well known to a person skilled in the art. They are thus not described in more detail.

The converter 30 further comprises a block 34 for determining the value P1 (value of the variable maximum associated with the current operating point). It receives the current value of the one or more operating parameters defining the current operating point (given the references $p_1$, $p_2$ ... $p_x$ in FIG. 3). In the example mentioned hereinabove, these are the current values for the pair of input and output voltages of the converter ($V_{low-side}$, $V_{high-side}$).

To summarise, the following links exist between the blocks in FIG. 3 and the steps in FIG. 2:
the block 34 for determining the value P1 carries out steps 22 and 23;
the measuring and/or computing block 35 carries out step 24;
the comparator 36 carries out step 25; and
the limiter block 32 carries out step 26.

Figure 9:
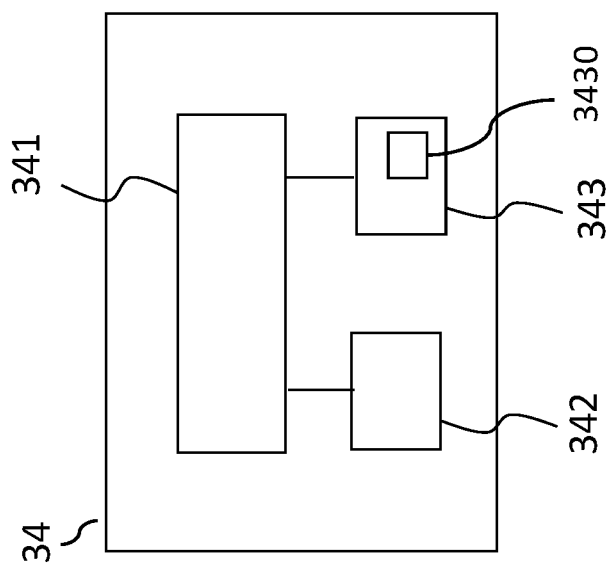
FIG. 9 shows the structure of the block 34 in FIG. 3 (block for determining the value P1), according to one specific embodiment of the invention.

FIG. 9 shows the structure of the block 34 for determining the value P1, according to one specific embodiment of the invention. This structure comprises a read/write memory 342 (for example a RAM), a read-only memory 343 (for example a ROM or a hard disk) and a processing unit 341 (for example equipped with a processor, and driven by a computer program 3430 stored in the read-only memory 343). On start-up, the code instructions of the computer program 3430 are, for example, loaded in the read/write memory 342 before being executed by the processor of the processing unit 341. This FIG. 9 shows only one specific way, out of several possible ways, of implementing the block 34 for determining the value P1. More specifically, the latter can be indifferently implemented either on a reprogrammable computing machine (a PC, a DSP or a microcontroller) running a program comprising a sequence of instructions, or on a dedicated computing machine (for example a set of logic gates such as an FPGA or an ASIC, or any other hardware module). In the case of implementation on a reprogrammable computing machine, the corresponding program (i.e. the sequence of instructions) may or may not be stored in a removable storage medium (such as a floppy disk, a CD-ROM or a DVD-ROM), which storage medium can be fully or partially read by a computer or a processor.

Figure 4:
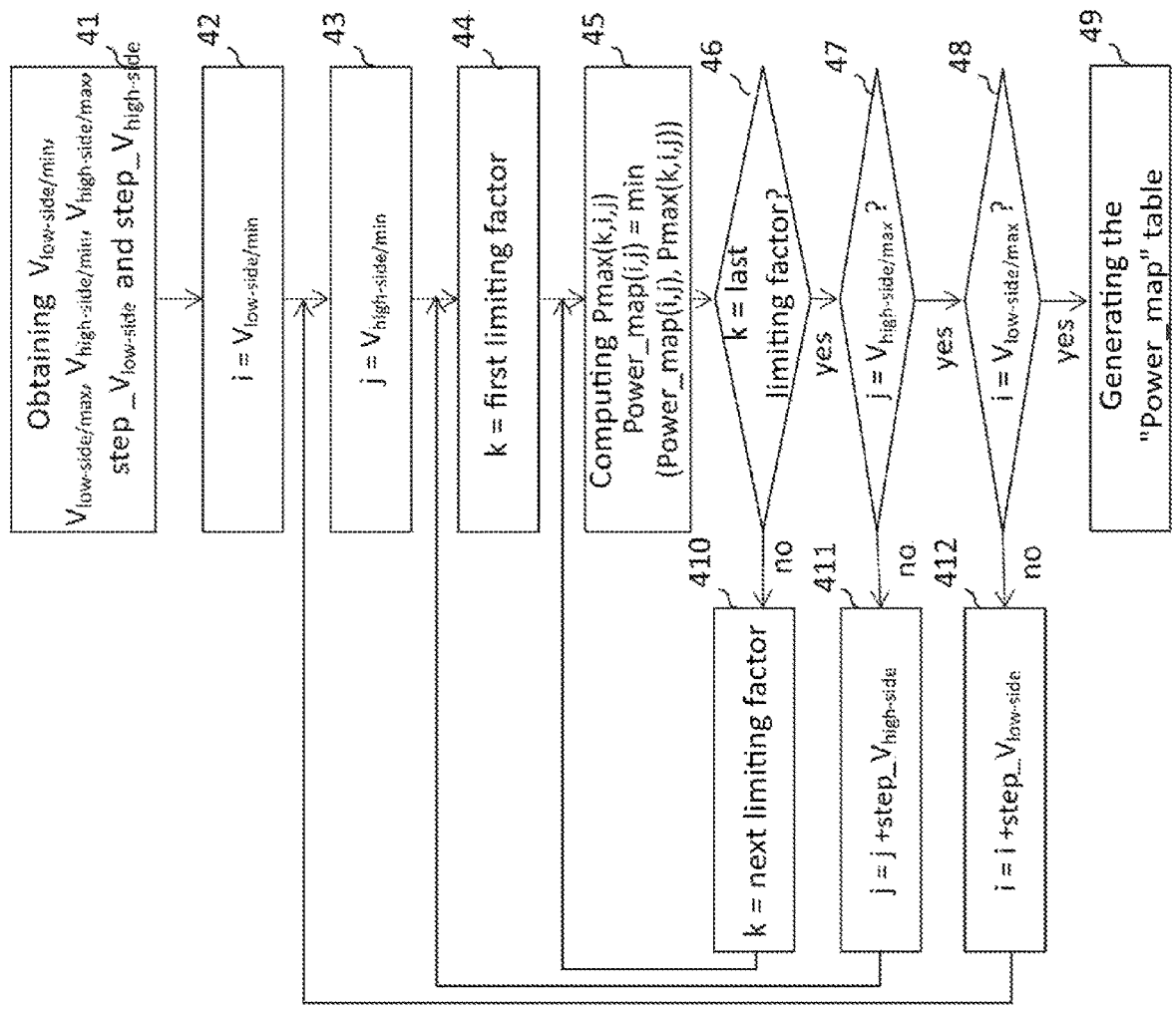
FIG. 4 shows an algorithm for computing a table used in one specific implementation of step 23 in FIG. 2, this table associating a value of the variable maximum with each of the possible operating points.

FIG. 4 shows an algorithm for computing the aforementioned table for one specific implementation of step 23 in FIG. 2. As a reminder, this table associates each possible operating point, i.e. each pair of input and output voltages of the converter ($V_{low-side}$, $V_{high-side}$), with a value P1 of the variable maximum (i.e. a maximum value of the output power) for this operating point. This table is referred to as a "Power_map", and the value P1 for the operating point (i,j)

is denoted "Power_map(i,j)", where i is a value of the input voltage $V_{low\text{-}side}$ comprised in the range [$V_{low\text{-}side/min}$, $V_{low\text{-}side/max}$], and j is a value of the output voltage $V_{high\text{-}side}$ comprised in the range [$V_{high\text{-}side/min}$, $V_{high\text{-}side/max}$]. "Step_$V_{low\text{-}side}$" is used to denote the step between two successive values of the input voltage $V_{low\text{-}side}$, and "step_$V_{high\text{-}side}$" is used to denote the step between two successive values of the output voltage $V_{high\text{-}side}$.

In a step 41, the following constants are obtained (see definitions hereinabove): $V_{low\text{-}side/min}$, $V_{low\text{-}side/max}$, $V_{high\text{-}side/min}$, $V_{high\text{-}side/max}$, step_$V_{low\text{-}side}$ and step_$V_{high\text{-}side}$.

In a step 42, the variable i is initialised with $V_{low\text{-}side/min}$.

In a step 43, the variable j is initialised with $V_{high\text{-}side/min}$.

In a step 44, the variable k is initialised with a first limiting factor taken into account for computing the value P1 for the operating point (i,j), denoted "Power_map(i,j)".

In a step 45, P max(k,i,j), a value of the variable maximum of the output power, is computed as a function of the limit value of the limiting factor k and of the current operating point (i,j). The value P1 for the operating point (i,j) is then updated with the following computation: Power_map(i,j)=min (Power_map(i,j), P max(k,i,j)).

In a step 46, it is determined whether the variable k contains the most recent limiting factor taken into account for the computation of Power_map(i,j) (i.e. the value P1 for the operating point (i,j)).

If the result of the test in step 46 is negative, step 410 is carried out, wherein the variable k receives the next limiting factor (from among those taken into account for computing the Power_map(i,j)), before returning to step 45.

If the result of the test in step 46 is positive, step 47 is carried out, wherein it is determined whether the variable j contains $V_{high\text{-}side/max}$.

If the result of the test in step 47 is negative, step 411 is carried out, wherein the variable j is incremented by step_$V_{high\text{-}side}$, before returning to step 44.

If the result of the test in step 47 is positive, step 48 is carried out, wherein it is determined whether the variable i contains $V_{low\text{-}side/max}$.

If the result of the test in step 48 is negative, step 412 is carried out, wherein the variable i is incremented by step_$V_{low\text{-}side}$, before returning to step 43.

If the result of the test in step 48 is positive, step 49 is carried out, wherein the "Power_map" table is generated by storing, for each operating point (i,j), the associated value Power_map(i,j) that was computed in the last iteration of step 45 for this operating point (i,j).

Steps 42 to 48 of the algorithm described hereinabove can be written in simplified form as follows:

```
i = V_low-side/min
While i <= V_low-side/max
    j = V_high-side/min
    While j <= V_high-side/max
        For "list of limiting factors"
            Computation Pmax(limiting factor,i,j)
            Power_map(i,j) = min (Power_map(i,j), Pmax(limiting
              factor,i,j))
        Next
        j = j + Step_V_high
    do
    i = i + Step_V_low
do
```

Figure 5:
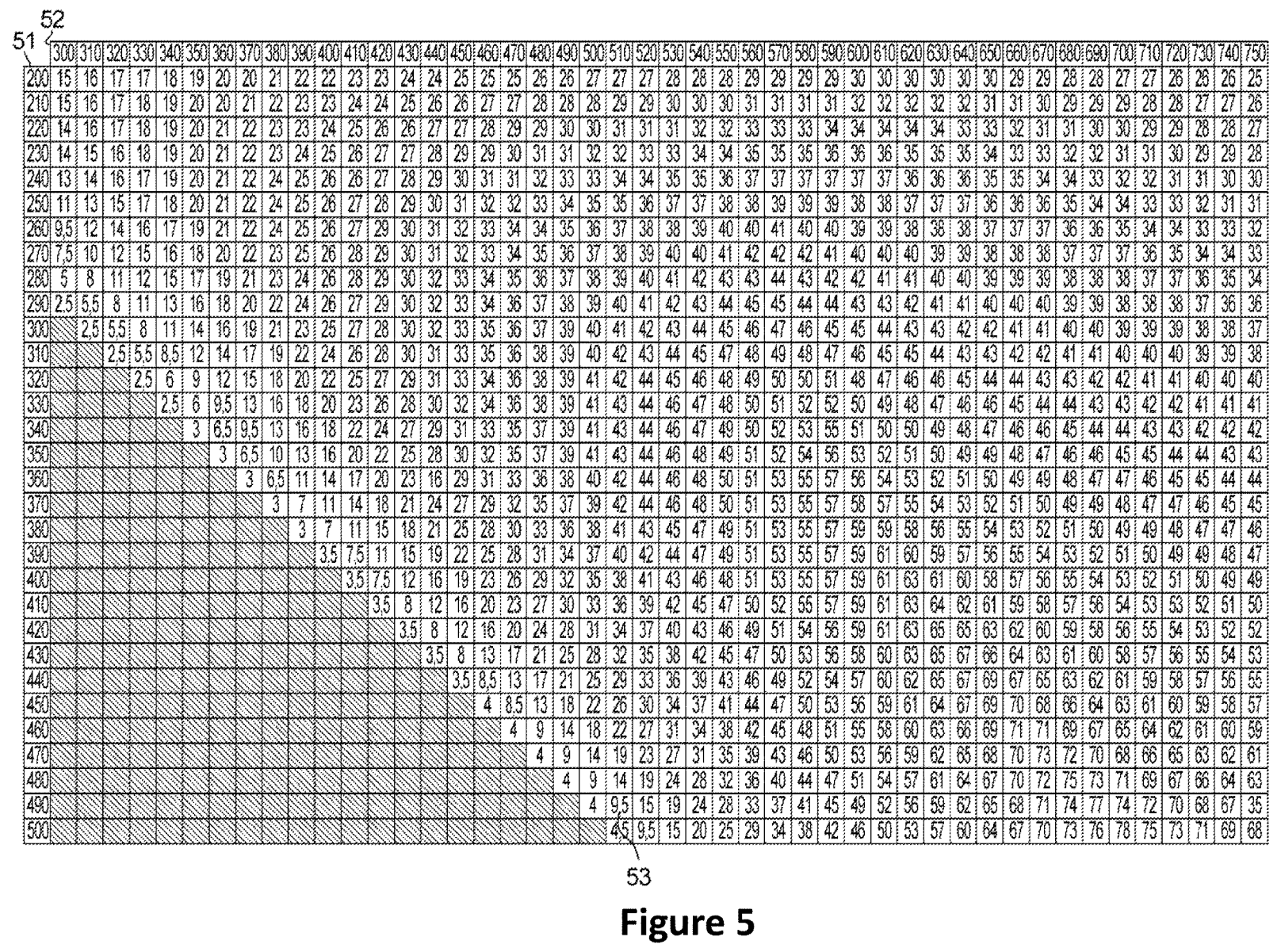

FIG. 5 shows one example of a table obtained by running the algorithm in FIG. 4. The first column 51 contains the range [$V_{low\text{-}side/min}$, $V_{low\text{-}side/max}$] expressed in V, where: $V_{low\text{-}side/min}$=200 V, $V_{low\text{-}side/max}$=500 V and step_$V_{low\text{-}side}$=10 V. The first row 52 contains the range [$V_{high\text{-}side/min}$, $V_{high\text{-}side/max}$] (in Volts), where: $V_{high\text{-}side/min}$=300 V, $V_{high\text{-}side/max}$=750 V and step_$V_{high\text{-}side}$=10 V. Each box at a row i/column j intersection (corresponding to a pair ($V_{low\text{-}side}$, $V_{high\text{-}side}$)) contains the associated value Power_map(i,j), expressed in kW. For example, for the operating point ($V_{low\text{-}side}$=490 V, $V_{high\text{-}side}$=510 V), this gives: Power_map(i,j)=9.5 kW (box with the reference numeral 53).

Figure 7:
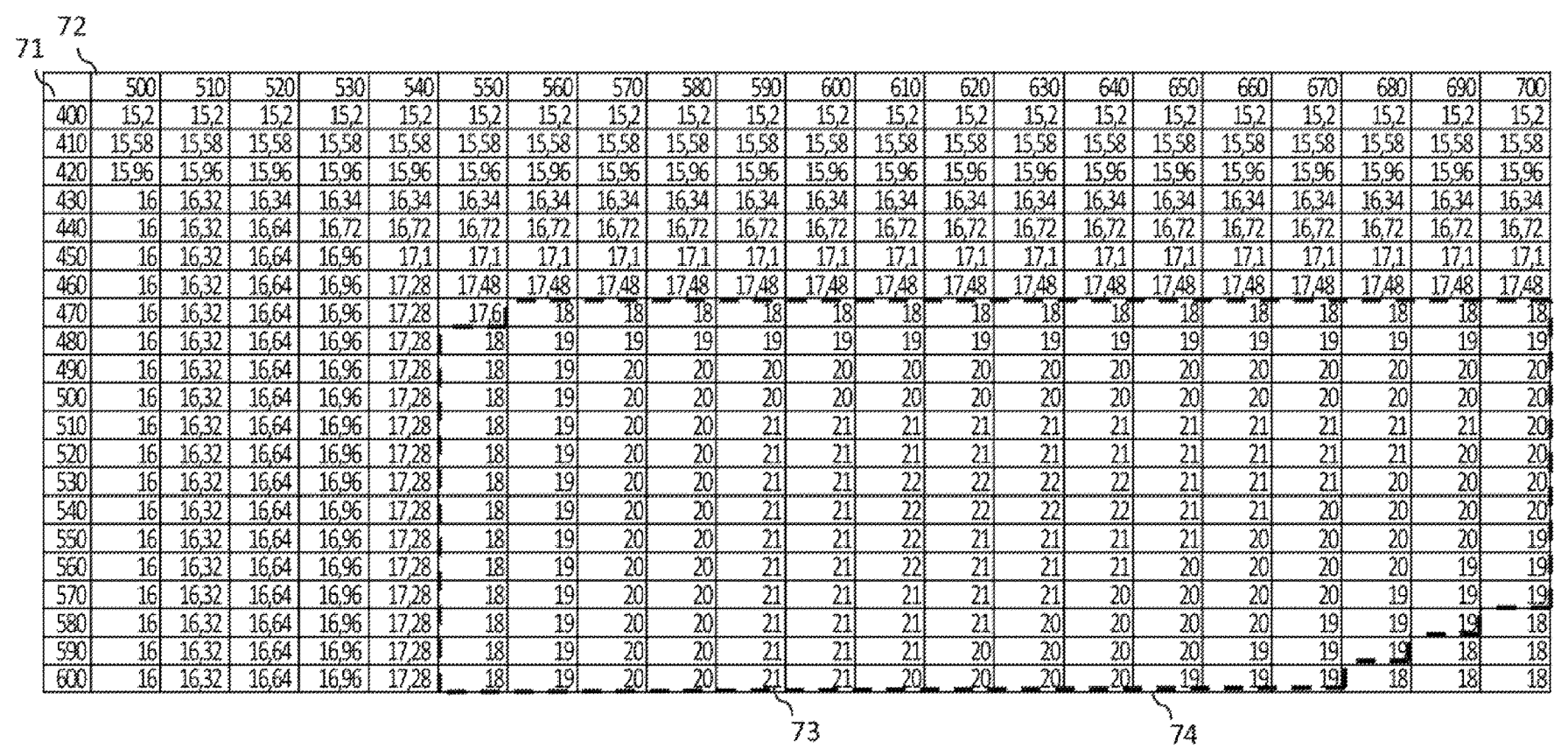

FIG. 7 is one example of a table of maximum powers obtained, for various operating points, with the converter in FIG. 3 (specific embodiment of the invention). The first column 71 contains the range [$V_{low\text{-}side/min}$, $V_{low\text{-}side/max}$] expressed in V, where: $V_{low\text{-}side/min}$=400 V and $V_{low\text{-}side/max}$=600 V. The first row 72 contains the range [$V_{high\text{-}side/min}$, $V_{high\text{-}side/max}$] (in Volts), where: $V_{high\text{-}side/min}$=500 V and $V_{high\text{-}side/max}$=700 V. Each box at a row/column intersection, corresponding to a pair ($V_{low\text{-}side}$, $V_{high\text{-}side}$), contains the associated maximum power value, expressed in kW. For example, for the operating point ($V_{low\text{-}side}$=600 V, $V_{high\text{-}side}$=590 V), there is a maximum power of 21 kW (box given the reference numeral 73).

Figure 6:
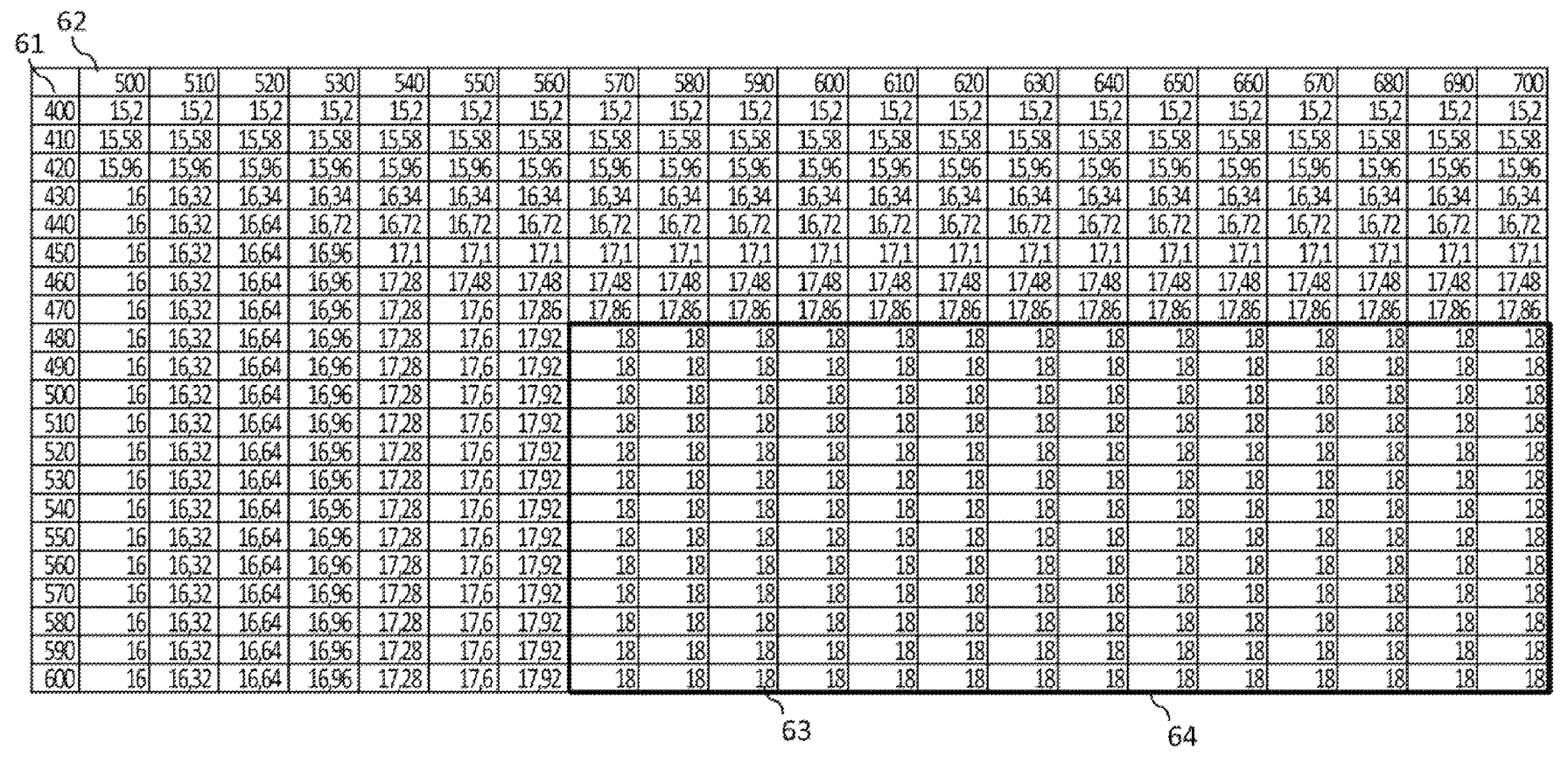

The area given the reference numeral 74 groups together the maximum power values that differ from those shown, for the same operating points, in the example in FIG. 6 (table of maximum powers obtained, for various operating points, with the known converter in FIG. 1) and the following constants: $I_{low\text{-}side/max}$=38 A, $I_{high\text{-}side/max}$=32 A and $P_{max}$=18 kW). It can be seen that the converter in FIG. 3 gives better results than the known converter in FIG. 1 since the values in the area 74 are higher than the corresponding values in FIG. 1, and in some cases are even higher than 18 kW which was the limit of the first constraint (constant: $P_{max}$=18 kW).

Figure 8:
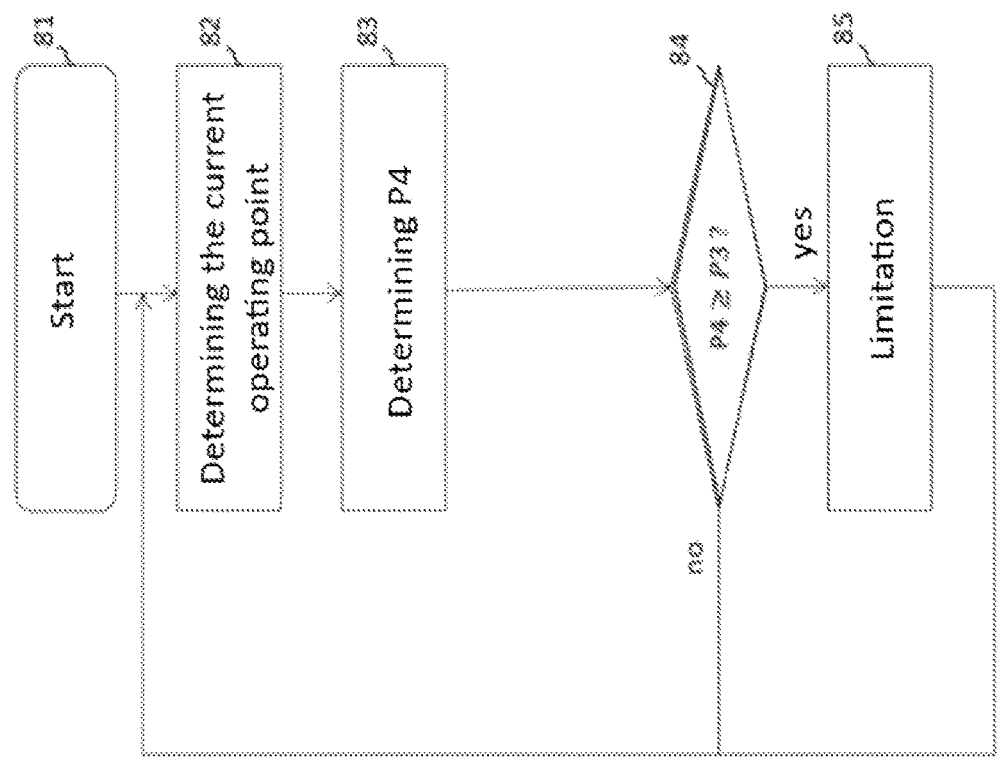
FIG. 8 shows a flow chart of a method, according to one specific embodiment of the invention, for controlling at least one second physical quantity (for example a chip temperature of a component) of a DC/DC-type converter.

FIG. 8 shows a flow chart of a method, according to one specific embodiment of the invention, for controlling at least one second physical quantity of a converter (of the DC/DC-type for example, however without being limited thereto). The second physical quantity of the converter has a fixed maximum (not variable as for the first physical quantity) for the plurality of possible operating points. This fixed maximum has a value referred to hereinafter as P3.

The description hereinbelow is given, for illustration purposes, for the specific case where the second physical quantity controlled is the chip temperature of a component included in the converter. In other embodiments, the control of the chip temperature of a component is supplemented or replaced by the control of one or more other second physical quantities, each having a fixed maximum for the plurality of possible operating points.

The aforementioned control (where the second physical quantity controlled is the chip temperature of a component included in the converter) can be supplemented or replaced by the control of one or more other second physical quantities, each having a fixed maximum for the plurality of possible operating points:

the temperature of a component;

the temperature of an element in the vicinity of a component or of the chip of a component (for example the base of the casing of a component or the base of the chip of a component);
the voltage of a point inside the converter;
the voltage deviation between two points inside the converter;
etc.

In the example shown in FIG. 8, the method comprises the steps 81 to 85 which, after the starting step 81, are carried out iteratively (i.e. for successive operating points in time).

Step 82: determining a current operating point of the converter from the plurality of possible operating points.

Step 83: determining (by measurement and/or computation) a current value of the second physical quantity, referred to as the fourth value P4.

Step 84: comparing P4 with P3. In one specific implementation, testing "Is P4 greater than or equal to P3?".

Step 85: activating or not activating a limiter circuit, which limits the second physical quantity, as a function of the result of the comparison in step 84. In one specific implementation, limiting the second physical quantity if P4 is greater than or equal to P3.

The invention claimed is:

1. A method implemented by a device for controlling an electric energy converter, which comprises the following, for at least one first physical quantity of the converter having a variable maximum that is a function of a plurality of possible operating points, each of the possible operating points being associated with a value of the variable maximum and being defined by a value of at least one operating parameter of the converter:
   determining a current operating point of the converter from said plurality of possible operating points;
   determining the value of the variable maximum associated with the current operating point, referred to as a first value, in function of one or more limiting factors;
   determining a current value of said at least one first physical quantity, referred to as a second value; and
   activating or not activating a limiter circuit, which limits said at least one first physical quantity, as a function of a result of a comparison between the first value and the second value.

2. The method according to claim 1, wherein the limiter circuit is activated if the second value is greater than or equal to the first value.

3. The method according to claim 1 wherein, when determining the first value:
   if a single limiting factor of the one or more limiting factors of said at least one first physical quantity is taken into account and has a limit value, the first value results from the following computation:
      computing the first value as a function of the limit value of the limiting factor and of the current operating point; and
   if a plurality of limiting factors of the one or more limiting factors of said at least one first physical quantity are taken into account and each have an associated limit value, the first value results from the following computations:
      for each of the plurality of limiting factors, computing a value of the variable maximum of said at least one first physical quantity, as a function of the limit value of the limiting factor and of the current operating point; and
      selecting, for the first value, a minimum value from the values of the variable maximum computed for the plurality of limiting factors.

4. The method according to claim 3, wherein the one limiting factor or each limiting factor of the plurality of limiting factors belongs to the group consisting of:
   an input current of the converter;
   an output current of the converter;
   an input current ripple of the converter;
   an output current ripple of the converter;
   a duty cycle of the converter;
   a temperature of an electronic chip incorporating at least one component included in the converter, in particular a diode or a transistor;
   a temperature of an inductor included in the converter;
   a current flowing through an electronic chip incorporating at least one component included in the converter, in particular a diode or a transistor;
   a current flowing through an inductor included in the converter;
   a power dissipated by an inductor included in the converter;
   a saturation current of an inductor included in the converter; and
   a factor external to the converter.

5. The method according to claim 1, wherein said at least one first physical quantity belongs to the group consisting of:
   an output power of the converter;
   an input power of the converter;
   an output current of the converter;
   an input current of the converter; and
   losses in the converter.

6. The method according to claim 1, wherein the determination of the first value comprises querying, as a function of the current operating point of the converter, a precomputed table and associating a value of the variable maximum with each of the possible operating points.

7. The method according to claim 1, wherein the determination of the first value comprises computing, dynamically at least in part, the first value as a function of the current operating point of the converter.

8. The method according to claim 1, wherein the method further comprises the following, for at least one second physical quantity of the converter having a fixed maximum for the plurality of possible operating points, the fixed maximum having a third value:
   determining a current value of said at least one second physical quantity, referred to as a fourth value; and
   activating or not activating a further limiter circuit, which limits said at least one second physical quantity, as a function of a result of a comparison between the third value and the fourth value.

9. The method according to claim 8, wherein the second is activated if the fourth value is greater than or equal to the third value.

10. The method according to claim 8, wherein said at least one second physical quantity belongs to the group consisting of:
   a chip temperature of a component included in the converter; and
   a temperature of a component included in the converter;
   a temperature of an element in the vicinity of a component included in the converter or in the vicinity of a chip of a component included in the converter;
   a voltage of a point inside the converter; and
   a voltage deviation between two points inside the converter.

11. The method according to claim 1, wherein said at least one operating parameter of the converter belongs to the group consisting of:
- an ambient temperature;
- a cooling temperature;
- an input voltage;
- an output voltage;
- a thermal resistance;
- a forward voltage Vf of at least one diode included in the converter;
- a resistance Rdson of at least one transistor included in the converter;
- a switching loss characteristic of at least one switching element of the converter;
- an electrical resistance of at least one current conductor of the converter;
- a characteristic of at least one wound element of the converter;
- a thermal resistance of at least one cooling element of the converter.

12. An electric energy converter, which comprises, for at least one first physical quantity of the converter having a variable maximum that is a function of a plurality of possible operating points, each of the possible operating points being associated with a value of the variable maximum and being defined by a current value of at least one operating parameter of the converter:
- means for determining a current operating point of the converter from said plurality of possible operating points;
- means for determining the value of the variable maximum associated with the current operating point, referred to as a first value, in function of one or more limiting factors;
- means for determining a current value of said at least one first physical quantity, referred to as a second value; and
- means for activating or not activating a limiter circuit, which limits said at least one first physical quantity, as a function of a result of a comparison between the first value and the second value.

13. The electric energy converter according to claim 12, wherein the converter further comprises, for at least one second physical quantity of the converter having a fixed maximum for the plurality of possible operating points, the fixed maximum having a third value:
- means for determining a current value of said at least one second physical quantity, referred to as a fourth value; and
- means for activating or not activating a further limiter circuit, which limits said at least one second physical quantity, as a function of a result of a comparison between the third value and the fourth value.

* * * * *